(12) United States Patent
Høeg

(10) Patent No.: US 11,268,384 B2
(45) Date of Patent: Mar. 8, 2022

(54) ROTARY SLIDING VANE MACHINE WITH SLIDE BEARINGS AND PIVOT BEARINGS FOR THE VANES

(71) Applicant: TOCIRCLE INDUSTRIES AS, Oslo (NO)

(72) Inventor: Arne Høeg, Hvalstad (NO)

(73) Assignee: TOCIRCLE INDUSTRIES AS, Oslo (NO)

( * ) Notice: Subject to any disclaimer, the term of this patent is extended or adjusted under 35 U.S.C. 154(b) by 0 days.

(21) Appl. No.: 16/959,443

(22) PCT Filed: Dec. 18, 2018

(86) PCT No.: PCT/NO2018/050316
§ 371 (c)(1),
(2) Date: Jul. 1, 2020

(87) PCT Pub. No.: WO2019/139485
PCT Pub. Date: Jul. 18, 2019

(65) Prior Publication Data
US 2020/0370553 A1 Nov. 26, 2020

(30) Foreign Application Priority Data

Jan. 11, 2018 (NO) .................................. 20180047

(51) Int. Cl.
*F01C 1/32* (2006.01)
*F04C 15/00* (2006.01)
(Continued)

(52) U.S. Cl.
CPC ................ *F01C 1/321* (2013.01); *F01C 1/44* (2013.01); *F01C 21/0809* (2013.01);
(Continued)

(58) Field of Classification Search
CPC ........ F01C 1/321; F01C 1/44; F01C 21/0809; F01C 21/0818; F01C 21/0881;
(Continued)

(56) References Cited

U.S. PATENT DOCUMENTS 3,869,231 A 3/1975 Adams
4,672,813 A 6/1987 David
(Continued)

FOREIGN PATENT DOCUMENTS

WO 9842967 10/1998
WO 2007032703 3/2007
WO 2014024517 2/2014

OTHER PUBLICATIONS

International Search Report issued in PCT/NO2018/050315, dated Nov. 3, 2019, pp. 1-3.
(Continued)

*Primary Examiner* — Mary Davis
(74) *Attorney, Agent, or Firm* — Jeffrey S. Melcher; Melcher Patent Law PLLC

(57) ABSTRACT

The invention relates to a rotary sliding vane machine (1) for fluid processing, comprising a housing (2) with a cavity (4) with a rotor (9). Vanes (12) are arranged in outwardly directed slots (13) in the rotor (9), and relative sliding between the vanes and the rotor provides spaces with variable volumes in the rotational direction. Each vane is supported by a vane bearing apparatus (102) comprising a slide bearing body (105) with a slot (13) forming a slide bearing for the vane (12), and a cylindrical convex face (116) facing away from the slot (13), and, on each side of the slot (13), a pivot bearing pad (106) with a cylindrical concave face (117) facing the slide bearing convex face (116), forming a pivot bearing for the vane.

13 Claims, 6 Drawing Sheets

(51) Int. Cl.
*F16C 23/04* (2006.01)
*F01C 21/08* (2006.01)
*F04C 2/32* (2006.01)
*F01C 1/44* (2006.01)
*F04C 2/44* (2006.01)
*F04C 18/32* (2006.01)

(52) U.S. Cl.
CPC .......... *F01C 21/0881* (2013.01); *F04C 2/321* (2013.01); *F04C 2/44* (2013.01); *F04C 15/0034* (2013.01); *F04C 15/0088* (2013.01); *F04C 18/321* (2013.01); *F16C 23/043* (2013.01); *F04C 2240/50* (2013.01); *F16C 23/045* (2013.01)

(58) Field of Classification Search
CPC .. F04C 15/0088; F04C 2240/50; F04C 2/321; F04C 2/44; F16C 23/043–046
See application file for complete search history.

(56) References Cited

U.S. PATENT DOCUMENTS

| | | | |
|---|---|---|---|
| 4,692,104 A | | 9/1987 | Hansen |
| 5,996,355 A | * | 12/1999 | Jirnov ................. F01C 21/0809 62/87 |
| 9,382,907 B2 | * | 7/2016 | Sekiya ................. F01C 21/0809 |
| 2011/0200473 A1 | | 8/2011 | Pekrul |
| 2020/0370552 A1 | * | 11/2020 | Hoeg ................. F01C 21/0809 |

OTHER PUBLICATIONS

Written Opinion issued in PCT/NO2018/050315, dated Aug. 3, 2019, pp. 1-3.
International Search Report issued in PCT/NO2018/050316, dated Dec. 3, 2019, pp. 1-3.
Written Opinion issued in PCT/NO2018/050316, dated Aug. 3, 2019, pp. 1-3.

* cited by examiner

ROTARY SLIDING VANE MACHINE WITH SLIDE BEARINGS AND PIVOT BEARINGS FOR THE VANES

The invention relates to a rotary sliding vane machine for fluid processing, comprising a housing with a cylindrical internal wall forming a cavity with an inlet and outlet for process fluid; a rotor rotatable in a rotational direction about an eccentric rotor axis of the cavity, a distance between an outer face of the rotor and the internal wall of the housing varies in the rotational direction; vanes rotatable about an centre axis of the cavity, the vanes extend through outwardly directed slots in the rotor to the internal wall of the housing, there is relative movement between the vanes and the rotor during rotation.

Closed spaces are defined between the vanes, the outer face of the rotor and the internal wall of the housing. Since the distance between the outer face of the rotor and the wall varies in the rotational direction, the volumes of the closed spaces also vary in the rotational direction. During operation, these spaces are filled with process fluid. The location and shape of the inlet and outlet are adapted to provide a flow of process fluid from the inlet to the outlet.

The ends of the cavity are closed by end caps, and the rotor and the vanes extend throughout the cavity in axial direction. Depending on requirements for the actual use of the rotary sliding vane machine, seals may be provided both at the outer edges of the vanes, at the sides of the vanes and at the sides of the rotor.

The rotor may be driven by an external driver. The rotor then drives the vanes, and the vanes move the process fluid. In this case, the rotary vane machine works as a pump if the process fluid is a liquid, and as a compressor if the process fluid is a gas or 2-phase, i.e. a mixture of liquid and gas. In other uses, the process fluid may drive the vanes and thereby the rotor, which can do external work. In this case, the rotary vane machine works as a hydro motor if the process fluid is a liquid, and as an expander if the process fluid is a gas or 2-phase.

U.S. Pat. No. 3,130,673 A describes a rotary vane pump in which the vanes slide freely in their slots, and thereby during rotation bear against the internal wall of the rotor due to the centrifugal force. In addition, the pressure in the pump acts on the inner side of the vanes and force them against the internal wall.

GB190621345A describes a rotary vane pump with a casing with a cylindrical cavity and two vanes independently rotatable about a spindle centrically located in the cavity. The vanes have a length equal to the internal radius of the cavity. A driven rotor with a cylindrical wall is eccentrically located in the casing, with the spindle inside the wall. The vanes pass through the wall of the rotor in two diametrically opposite openings. During the rotation, the rotor drives the vanes to rotation about the spindle. The spindle and a shaft for driving the rotor extend into the cavity from opposite sides. In this way the spindle does not interfere with the rotor, and the shaft does not interfere with the vanes, during the rotation.

WO9943926A1 describes a rotary-piston machine comprising a housing having a cavity, a rotor received in the housing, which rotor having a rotor axis and a peripheral surface, inlet and outlet passages in communication with said cavity, one or more vanes radially slidably received in slots in the rotor, each vane extending radially from the internal surface of the housing to the rotor axis, and at least one working chamber being part of the cavity and which is defined by the internal surface of the housing, the peripheral surface of the rotor and the side surface of at least one vane. Each vane is articulated connected about an axis to one end of a control arm and is in the other end pivotably journaled in a fixed axle shaft having a central axis being coincident with the axis extending centrally through the cavity of the housing, which axis extend in parallel with and spaced from the rotor axis, and the rotor proper constitute the unit for power take off or power input.

U.S. Pat. No. 3,130,673 A thus describes a rotary sliding vane machine with freely sliding vanes, while GB190621345A and WO9943926A1 describe a rotary sliding vane machine with guided vanes. For a high-performance rotary sliding vane machine, guided vanes are preferable to freely sliding vanes, because guided vanes make it easier to provide sealing between the vanes without excessive wear of the vanes. The rotary sliding vane machine of GB190621345A is a low-pressure machine, which is not suited for high performance. The rotary sliding vane machine of WO9943926A1 is suited for high performance. In this machine, the vanes are guided both in pivoting and sliding. A more compact and less complex design, would, however be preferable.

For all rotary sliding vane machines, the pressure varies from the inlet to the outlet. Consequently, there are varying differential pressures across the vanes, which causes varying tangential forces acting on the vanes. Normally, there is also a change of direction of the tangential forces during the rotation.

The tangential force acting on each vane creates a bending moment in the vane. The tangential force and the bending moment are absorbed by forces acting on the vane in the slot. The tangential force and the bending moment also tilt the vane in its slot. Since the tangential force changes direction during the rotation, the vane is tilted back and forth in its slot. There are also dynamic forces caused by inertial forces, which act on the vane.

The forces in the slots increase friction during sliding of the vanes in the slots, which may reduce sliding and increase wear of the vanes. One way of reducing the friction is to use slide bearings. The slide bearings can be either dry, solid-state lubricated, lubricated by a liquid lubricant or lubricated by the process fluid.

One way of lubricating the vanes in the slots would be to use hydrodynamic bearings, i.e. bearings with bearing pads in which a film of lubricant between the pad and the vane is built up by the movement of the vane. The continuous change of direction of the vane's movement would, however, prevent the build-up of a sufficiently thick film of lubricant, and hydrodynamic bearings are therefore not always suited.

In many services, to not contaminate the process fluid, lubricants other than liquid process fluid may be undesirable. Examples include using the rotary sliding vane machine as a steam expander in electric power generation or as a compressor in a heat pump in an industrial process.

A purpose of the invention is to provide a high-performance rotary sliding vane machine with guided vanes with a compact design. Another purpose of the invention is to provide a rotary sliding vane machine with lubricated vanes in which the design is efficient and favourable with respect to assembly and maintenance. A further purpose is that the invention at least shall provide an alternative to prior art.

Further features, advantages and purposes of the invention and how they are achieved will appear from the description, the drawings and the claims.

The invention thus relates to a rotary sliding vane machine for fluid processing, comprising:

a housing with a cylindrical internal wall forming a cavity with an inlet and outlet for process fluid;

a rotor rotatable in a rotational direction about an eccentric rotor axis of the cavity, a distance between an outer face of the rotor and the internal wall of the housing varies in the rotational direction;

vanes rotatable about an centre axis of the cavity, the vanes extend through outwardly directed slots in the rotor to the internal wall of the housing, there is relative movement between the vanes and the rotor during rotation.

According to the invention the rotor comprises a rotor body and vane bearing apparatuses, each vane bearing apparatus comprises:

a slide bearing body with a slot for the vane, on each side of the slot the slide bearing body has a flat face facing the slot, forming a slide bearing for the vane; on each side of the slot the slide bearing body further has a cylindrical convex face facing away from the slot, the cylindrical convex faces on opposite sides of the slot have a common axis parallel to the rotor axis;

on each side of the slot, a pivot bearing pad attached to or integral with the rotor body, the pivot bearing pad has a cylindrical concave face facing the slide bearing convex face, forming a pivot bearing for the vane, with the axis of the slide bearing convex faces forming a pivot bearing axis;

on each side of the slot, a first bearing fluid supply line between a first bearing fluid supply and the pivot bearing concave face; and on each side of the slot, a second bearing fluid supply line between a second bearing fluid supply and the slide bearing flat face, for supplying bearing fluid to a bearing fluid film between the slide bearing flat face and the vane.

In one embodiment of the rotary sliding vane machine, on each side of the slot the slide bearing body has an indentation forming a cylinder. A plunger is received in the cylinder, and bearing fluid is supplied to the pivot bearing, through the cylinder and to a slide bearing pad connected to or integral with the plunger. The plunger moves in the cylinder during operation, and this provides a vane bearing apparatus that increases the bearing fluid pressure and adapts to the vane.

The number of vanes depends on the actual design, and is typically between 2 and 10.

The vane bearing apparatuses are part of the rotor. To distinguish the vane bearing apparatuses from the rest of the rotor, the rest of the rotor is designated rotor body.

Embodiments of the invention will now be described with reference to the accompanying drawings, in which:

FIG. 1 is a cross sectional view of a rotary sliding vane machine 1 according to the invention, seen in axial direction.

Figure 1:
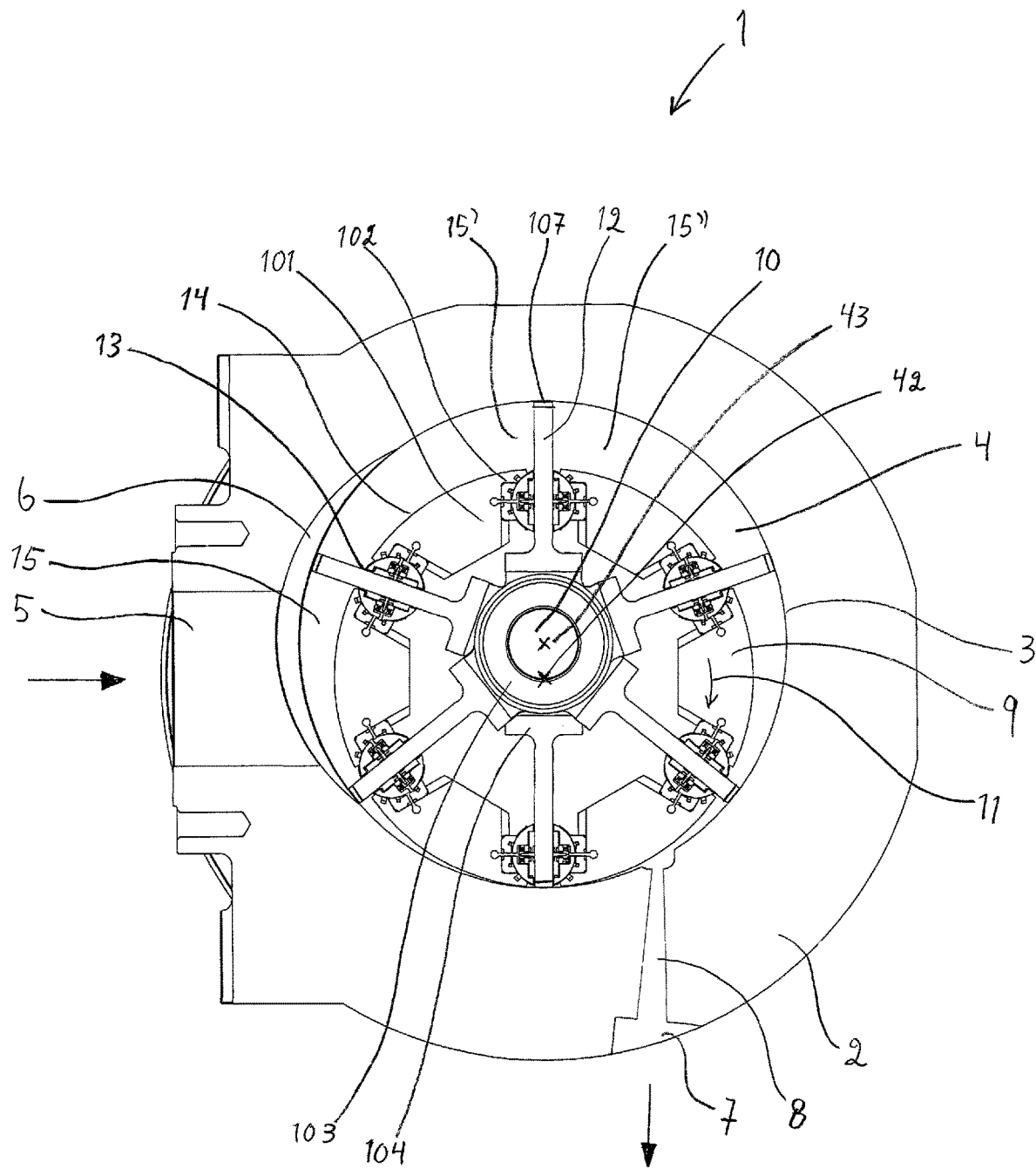
FIG. 1 is a cross sectional view of a rotary sliding vane machine according to the invention.

A housing 2 has an internal wall 3 that forms a cylindrical cavity 4 with a cavity axis 43. An inlet channel 6 extends from an inlet 5 for process fluid to cavity 4, and an outlet channel 8 extends from cavity 4 to an outlet 7 for process fluid. A stationary spindle 10 is centrally located in cavity 4. Six vanes 12 are via flanges 104 and not illustrated bolts rigidly connected to corresponding spindle rings 103 which are independently rotatable about spindle 10. By this arrangement, the vanes 12 are independently rotatable about cavity axis 43. Only the foremost spindle ring 103 is visible.

A cylindrical rotor 9 is connected to a not illustrated journaled shaft, and rotates eccentrically in cavity 4 about a rotor axis 42 in direction 11. Rotor 9 comprises a rotor body 101 and vane bearing apparatuses 102. The vanes 12 extend radially from spindle 10, through radial slots 13 in the vane bearing apparatuses 102, to housing internal wall 3. Vane seals 107 seal against wall 3.

Due to the eccentricity of rotor 9, a distance between an outer face 14 of rotor 9 and internal wall 3 of housing 2 varies in rotational direction 11. Spaces 15 are formed between vanes 12, wall 3 and rotor outer face 14, and since the distance between face 14 and wall 3 varies in rotational direction 11, the volumes of spaces 15 also vary in rotational direction 11. During use of the rotary sliding vane machine, spaces 15 are filled with process fluid. The varying volumes of spaces 15 ensure that the net flow of process fluid is from inlet 5 to outlet 7. At inlet 5, spaces 15 have inlet pressure, while at outlet 7, spaces 15 have outlet pressure. The pressures of spaces 15 therefore vary around rotor 9.

Since rotor 9 is eccentrically mounted in cavity 4, there is relative angular and radial movement between vanes 12 and rotor 9 during rotation, i.e., as understood from a comparison between the different vanes 12 of FIG. 1, there is both a sliding in an out and a pivoting back and forth between the vane 12 and the vane bearing apparatus 102 during rotation.

Figure 2:
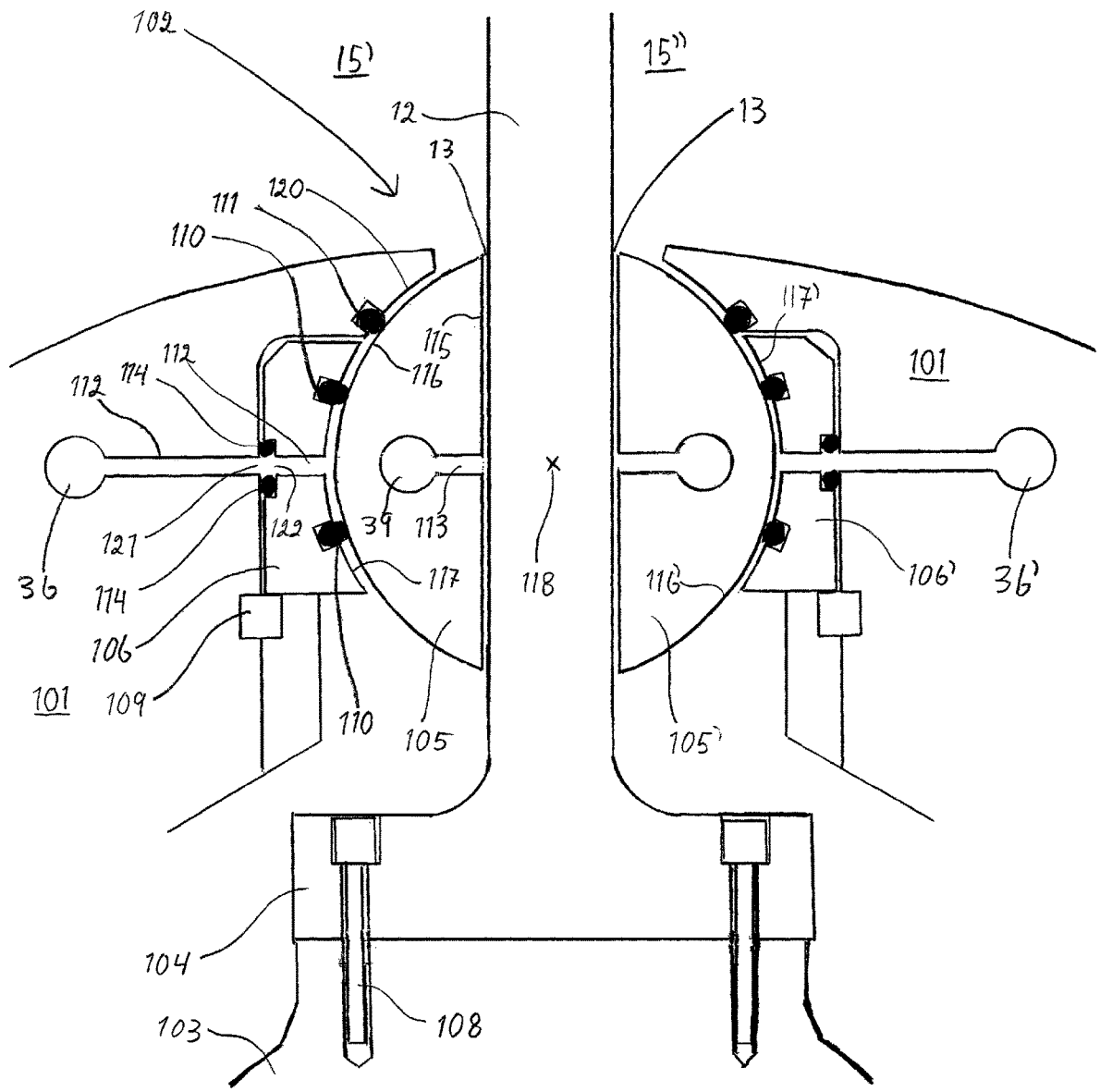
FIG. 2 is a cross sectional view illustrating a vane bearing apparatus of a rotary sliding vane machine according to the invention.

FIG. 2 is a cross sectional view illustrating the rotor body 101 and a vane bearing apparatus 102 in the same position as the top vane bearing apparatus 102 of FIG. 1, but in a simpler embodiment.

The vane bearing apparatus 102 of FIG. 2 comprises a slide bearing body with a left portion 105 and a right portion 105'. The slide bearing body 105, 105' is cylindrical, with a slot 13 extending in its longitudinal direction, which is parallel with rotor axis 42. Vane 12 extends through slot 13, in the full length of the slot. In both ends (not illustrated in FIG. 2) slide bearing body 105, 105' extends beyond slot 13. The vane bearing apparatus comprises two identical halves, located on opposite sides of slot 13. Corresponding elements on left and right side are designated by the same reference numerals, with those on right side primed. To simplify the description, focus will be on left side, and right side discussed when required.

Slide bearing body 105 has a flat face 115 facing slot 13, forming a slide bearing for vane 12. Slide bearing body 105 further has a cylindrical convex face 116 facing away from slot 13. The two cylindrical convex faces 116, 116' of the slide bearing body have a common axis 118 parallel to rotor axis 42.

Vane bearing apparatus 102 of FIG. 2 further comprises a pivot bearing pad 106 attached to the rotor body 101 by a clamp 109. Alternatively, pivot bearing pad 106 could have been integral with rotor body 101. Pivot bearing pad 106 has a cylindrical concave face 117 facing slide bearing convex face 116. The two pivot bearing concave faces 117, 117' surround the slide bearing convex faces 116, 116', and together they form a pivot bearing for vane 12 with axis 118 as pivot bearing axis.

A first bearing fluid supply line 112 extends from a first bearing fluid feed line 36 to an opening 121 in rotor body 101, further through an opening 122 in pivot bearing pad 106, to an opening in pivot bearing concave face 117, for supplying bearing fluid between pivot bearing concave face 117 and slide bearing convex face 116. A seal 114 ensures there is no leakage of bearing fluid between rotor body 101 and pivot bearing pad 106.

A second bearing fluid supply line 113 extends from a second bearing fluid feed line 39 to slide bearing flat face 115, for supplying bearing fluid to a bearing fluid film between slide bearing flat face 115 and vane 12.

Figure 3:
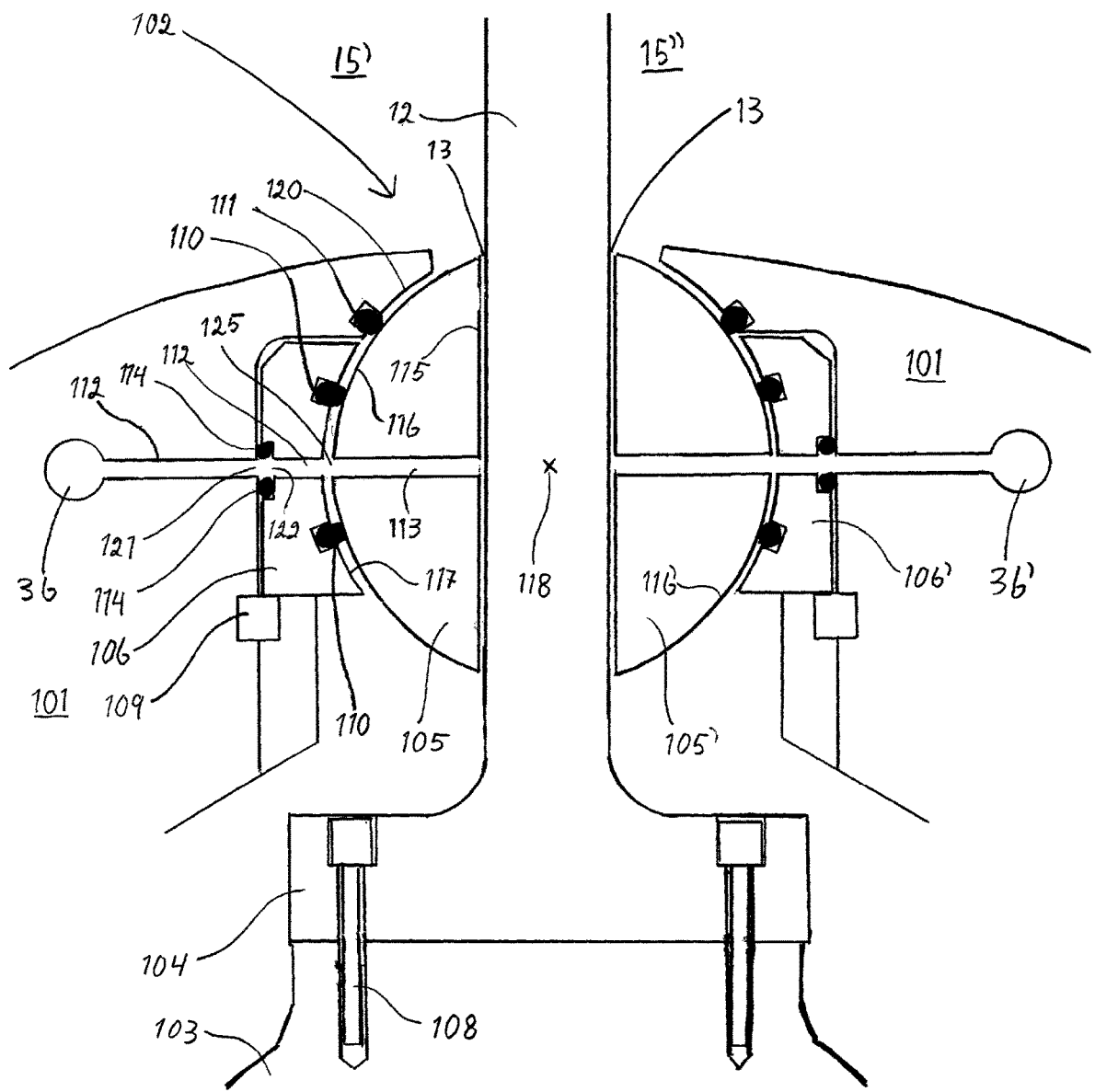
FIG. 3 is a cross sectional view illustrating an alternative to the vane bearing apparatus of FIG. 2.

FIG. 3 illustrates an alternative to the vane bearing apparatus of FIG. 2 in which second bearing fluid feed line 39 has been omitted, and second bearing fluid supply line 113 extends from an inlet 125 between pivot bearing concave face 117 and slide bearing convex face 116, for supplying bearing fluid to the bearing fluid film between slide bearing flat face 115 and vane 12.

First bearing fluid feed line 36, and second bearing fluid feed line 39, if included, extends in axial direction of rotor 9, and is part of a branched network of channels, bores or tubes that feed bearing fluid to the hydrostatic bearings. Bearing fluid is fed from a stationary supply, and transferred to the rotor during rotation, via stationary and rotating parts and seals between them.

FIGS. 2 and 3 also show the connection between vane flange 104 and spindle ring 103 by means of bolts 108.

Figure 4:
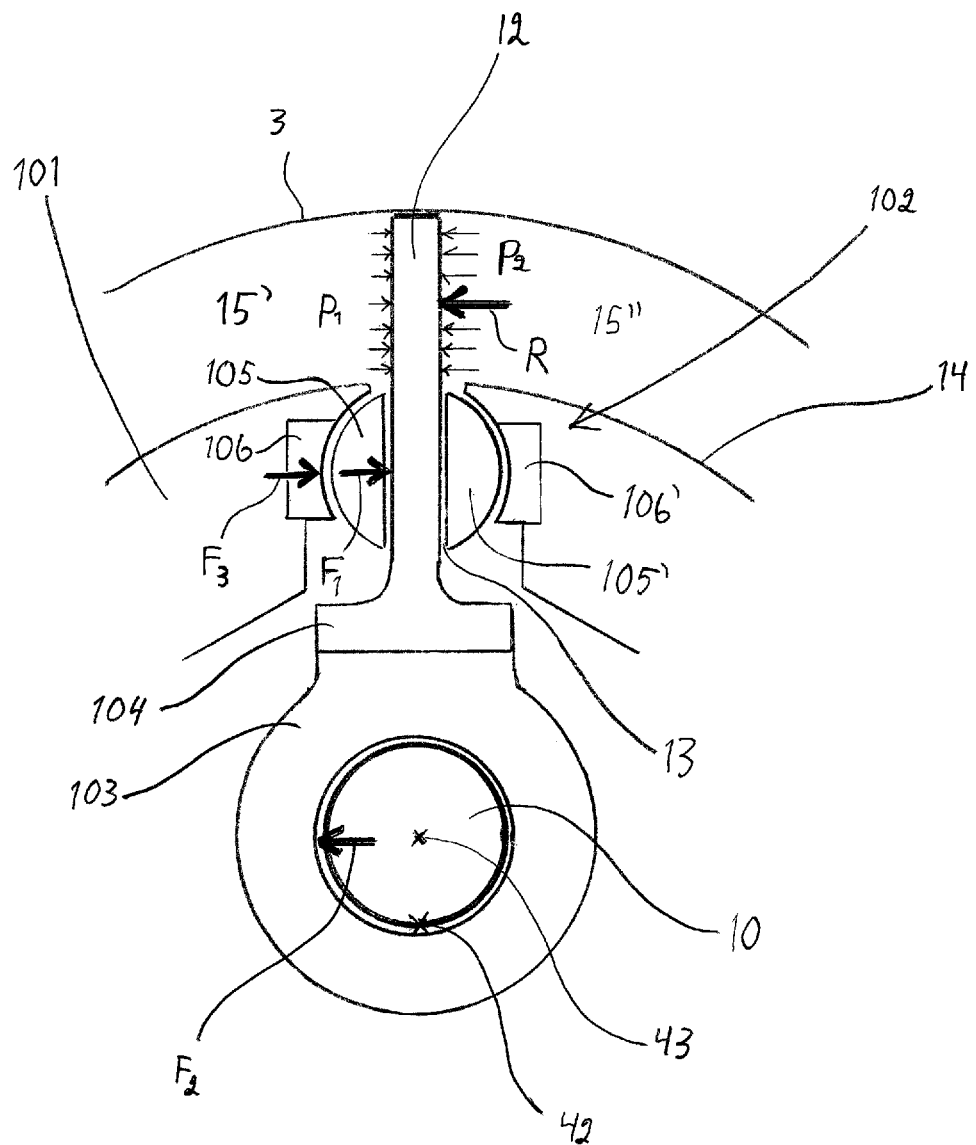
FIG. 4 is a cross sectional view illustrating forces attacking a vane in a rotary sliding vane machine according to the invention.

Before a further description of vane bearing apparatus 102, reference is made to FIG. 4, which is a simplified cross-sectional view illustrating forces attacking vane 12 of FIGS. 2 and 3, and how these forces are absorbed. With reference to FIG. 1, a space 15' on left side of vane 12 has pressure $p_1$, and a space 15" on right side of vane 12 has pressure $p_2$, higher than pressure $p_1$. Thus, there is a differential pressure across vane 12. The forces of the differential pressure can be represented by a tangential resultant force R with a magnitude equal to the product of the differential pressure and the area of the vane exposed to the differential pressure. Tangential force R and a bending moment created by R are absorbed in slot 13 by a reaction force $F_1$ from slide bearing body 105, and a smaller reaction force $F_2$ from spindle 10. $F_1$ is directed opposite R, while $F_2$ is directed in the same direction as R. $F_1$ is absorbed by pivot bearing pad 106 as a force $F_3$ and transferred to rotor body 101.

Due to equilibrium:

$$F_1 = F_2 + R$$

and $$F_1 = F_3$$

Since the pressures in spaces 15', 15" vary during rotation, the differential pressure across vane 12 also varies during rotation. Further, since the distance between rotor outer face 14 and housing internal wall 3 varies during rotation, the area of vane 12 exposed to the differential pressure also varies. The tangential force R therefore varies during rotation. Normally the differential pressure changes direction during rotation, and the tangential force R therefore also changes direction. When tangential force R varies and changes direction, forces $F_1$, $F_2$ and $F_3$ also vary and change direction. In addition to forces due to the differential pressure, there are also dynamic forces caused by vibrations, centripetal acceleration, Coriolis forces and other inertial forces, which contribute to the forces between vane 12 and the slide bearing and the pivot bearing.

With further reference to FIGS. 2 and 3, during operation of the rotary sliding vane machine, bearing fluid at supply pressure flows from first bearing fluid feed line 36, through first bearing fluid supply line 112, to pivot bearing concave face 117, where it is distributed between pivot bearing concave face 117 and slide bearing convex face 116. In the vane bearing apparatus of FIG. 2, bearing fluid at supply pressure also flows from second bearing fluid feed line 39 through second bearing fluid supply line 113, to slide bearing flat face 115, where it is distributed between slide bearing flat face 115 and vane 12 and forms the slide bearing fluid film. In the alternative vane bearing apparatus of FIG. 3, where there is no second bearing fluid feed line, some bearing fluid flows from the area between pivot bearing concave face 117 and slide bearing convex face 116 into inlet 125, through second bearing fluid supply line 113, to slide bearing flat face 115, where it is distributed between slide bearing flat face 115 and vane 12 and forms the slide bearing fluid film.

In the slide bearing, at the edges of slide bearing flat face 115, bearing fluid leaks from the bearing fluid film into slot 13, and ends up in space 15' in the cavity, where it mixes with the process fluid. For this reason, the pressure, and consequently the bearing force, of the slide bearing is reduced towards its edges.

In the pivot bearing, FIGS. 2 and 3 illustrates an embodiment in which a pivot bearing seal 110 surrounds the end of first bearing fluid supply line 112 at pivot bearing concave face 117. Pivot bearing seal 110 has the effect that very little bearing fluid leaks from the pivot bearing into slot 13. Pivot bearing seal 110, pivot bearing concave face 117 and slide bearing convex face 116 define a pressure chamber in which the pressure is maintained throughout the area defined by pivot bearing seal 110. This pressure chamber provides a hydraulic force transfer between pivot bearing concave face 117 and slide bearing convex face 116.

Pivot bearing seal 110 may be omitted, and if so, the bearing fluid between pivot bearing concave face 117 and slide bearing convex face 116 will form a film as in a normal hydrostatic bearing, with bearing fluid leaking at its edges, and the pressure reduced towards its edges.

On each side of slot 13, rotor body 101 has a cylindrical rotor body concave face 120 facing slide bearing convex face 116. Rotor body concave face 120 and pivot bearing concave face 117 are contiguous, and separated by a rotor body seal 111.

It has been found, that during the pivoting of vane 12 back and forth in slot 13 during operation of the rotary sliding vane machine, the forces related to the vane, the slide bearing and the pivot bearing, may act in the area defined by pivot bearing seal 110 and rotor body seal 111. Rotor body seal 111 ensures that bearing fluid leaking from pivot bearing seal 110 at least to some extent remains in this area and lubricates this area. Further, under extreme conditions, e.g. due to unexpected pressures or vibrations, the forces may act beyond rotor body seal 111, and slide bearing convex face 116 then loads rotor body concave face 120. Rotor body concave face 120 thus forms a back-up for the hydrostatic pivot bearing.

Generally, the force acting between a surface and a fluid is equal to the product of the pressure in the fluid and the area of the surface. However, for a hydrostatic bearing pad, the bearing fluid film pressure varies over the area, and is lowest at the edges of the bearing pad. To simplify the calculation of the force, a constant pressure in the bearing fluid film and an effective area of the bearing pad is assumed. The effective area is typically 60-80% of the area of the bearing pad.

With reference to FIG. 4 and the discussion of forces above, force $F_1$ from slide bearing body 105, i.e. slide bearing flat face 115, is equal to force $F_3$ from pivot bearing pad 106. It has been found that to ensure a smooth operation of vane bearing apparatus 102, the difference between an effective area of slide bearing flat face 115 and an area defined by pivot bearing seal 110 should be maximum 25%.

Figure 5:
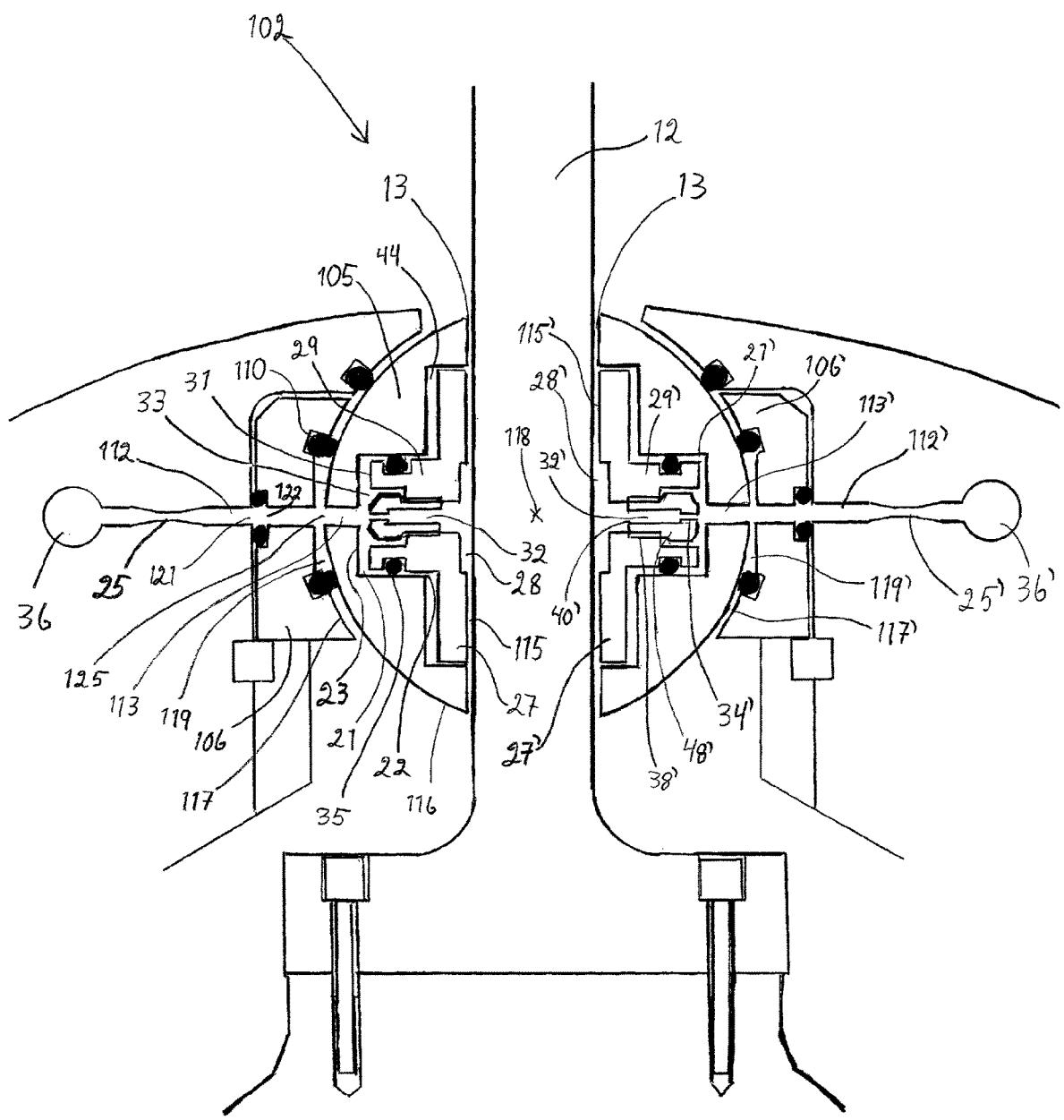
FIG. 5 is a cross sectional view illustrating a vane bearing apparatus of FIG. 1 in more detail.

FIG. 5 is a cross sectional view that illustrates another vane bearing apparatus according to the invention, corresponding to the vane bearing apparatus 102 for the top vane 12 of FIG. 1, in more detail. Vane bearing apparatus 102 of FIG. 5 has many similarities with vane bearing apparatus 102 of FIGS. 2 and 3, and similar items will only be described if necessary for understanding FIG. 5.

The elements on both side of slot 13 are identical. Corresponding elements on left and right side are designated by the same reference numerals, with those on right side primed. Elements on both side of slot 13 will be described only when required.

Slide bearing body 105 has an indentation forming a cylinder 21 with a bottom 23 and an opening 22 towards slot 13. Second bearing fluid supply line 113 is formed by a bore in slide bearing body 105, extending from inlet 125 in slide bearing convex face 116 to cylinder 21. A plunger 29 with a bottom 31 is received in cylinder 21, and an O-ring 35 seals between plunger 29 and cylinder 21. A slide bearing pad 27 with a recess 28 and a face 115 forming the slide bearing flat face is integral with plunger 29, and is received in an enlargement 44 of cylinder 21. Alternatively, slide bearing pad 27 and plunger 29 could have been separate items, and mechanically connected, e.g. via threading. Recess 28 facilitates distribution of bearing fluid into the slide bearing fluid film between slide bearing pad flat face 115 and vane 12. Recess 28 is therefore preferred, but may be dispensed with. A bearing fluid channel 32 extends between an opening 33 in plunger bottom 31 and slide bearing pad recess 28. Alternatively, if recess 28 is dispensed with, the bearing fluid channel 32 may have its opening in slide bearing pad flat face 115.

An exchangeable insert 48' is screwed into plunger 29' in a threaded connection 38'. Insert 48' provides the bearing fluid channel 32', and has a flow restriction 34' formed by a constriction of bearing fluid channel 32'. Insert 48' also has an internal screw drive 40' that matches a suitable key, e.g. a hex key, to enable insertion and removal. Inserts 48' can be made with different flow restrictions, for adaption to different operating conditions.

Pivot bearing pad 106 has in its concave face 117 a recess 119, which is surrounded by the pivot bearing seal 110. Recess 119 facilitates distribution of bearing fluid between pivot bearing concave face 117 and slide bearing convex face 116. Recess 119 is therefore preferred, but could have been dispensed with.

Still with reference to FIG. 5, during rotation, pressure changes of the process fluid cause varying tangential forces on vane 12, as discussed with reference to FIG. 4. These tangential forces slightly tilt vane 12 back and forth in slot 13, towards and away from slide bearing pads 27, 27'. When vane 12 is tilted towards left slide bearing pad 27, this increases the pressure in left slide bearing fluid film, which in turn forces left slide bearing pad 27 and left plunger 29 towards left cylinder bottom 23. This increases the bearing fluid pressure in left cylinder 21, and this pressure increase propagates to left pressure chamber defined by pivot bearing seal 110, pivot bearing concave face 117 and slide bearing convex face 116. Left first bearing fluid supply line 112 has a flow restriction 25 formed by a constriction, and this restricts return of bearing fluid to left first bearing fluid feed line 36, which maintains the bearing fluid pressure in left pressure chamber defined by pivot bearing seal 110, pivot bearing concave face 117 and slide bearing convex face 116, and left cylinder 21. Bearing fluid with increased pressure thereby flows from left cylinder 21, through left bearing fluid channel 32 to recess 28 in left slide bearing pad flat face 115, and to left slide bearing fluid film. This removes fluid from left cylinder 21, and consequently the slide bearing fluid film pushes left slide bearing pad 27 further towards left cylinder 21, and left plunger 29 further into left cylinder 21. This continues until vane 12 is tilted the other way.

Simultaneously vane 12 is tilted away from right slide bearing pad 27', which reduces the pressure in right slide bearing fluid film. This pressure reduction propagates through right bearing fluid channel 32' to right cylinder 21', and further to right pressure chamber defined by pivot bearing seal 110', pivot bearing concave face 117' and slide bearing convex face 116'. The reduced pressure causes bearing fluid at supply pressure to flow from right first bearing fluid supply line 112' to recess 119' in right pivot bearing concave face 117', and further through right second bearing fluid supply line 113' to right cylinder 21'. The bearing fluid in right cylinder 21' forces right plunger 29' and right bearing pad 27' outwards, towards vane 12. At the same time, due to the pressure reduction of right slide bearing fluid film, bearing fluid flows from right cylinder 21', through right bearing fluid channel 32' to recess 28' in right slide bearing pad flat face 115', and to right slide bearing fluid film. This reduces the pressure in right cylinder 21', and consequently more bearing fluid at supply pressure enters right cylinder 21' from right second bearing fluid supply line 113' and right first bearing fluid supply line 112'. This continues until vane 12 is tilted the other way.

Thus, when vane 12 forces left bearing pad 27 to the left, right bearing pad 27' also moves to the left, towards vane 12, and vice versa. In this way the position of the bearing pads 27, 27' adapts to the position of vane 12, and at the same time a bearing fluid film that allows the sliding of vane 12 is maintained. A particular advantage is that bearing pads 27, 27' adapt their positions to production deviations and thermal deformations of the items forming the hydrostatic bearings, the vane and the slot.

The recesses 28 and 119 forms bearing fluid reservoirs that smoothens the movement of the various parts of the vane bearing apparatus 102.

The restriction 34 of the bearing fluid channel 32 and the restriction 25 of the first bearing fluid supply line 112 slow the flow of bearing fluid and reduces the propagation of bearing fluid pressure. The illustrated constrictions are examples of flow reducers, but any type of flow reducer can be used. The restrictions may be distinct flow restrictors, but can also be formed by the fluid line itself, being a function of the diameter, shape and length of the fluid line. Restriction 25 may alternatively be a check-valve.

In some operating conditions, the slide bearing pads 27, 27' on opposite sides of slot 13 are unevenly loaded by vane 12. It has been found, that during such operating conditions, it is preferred that the restriction 25, 25' of the first bearing fluid supply line 112, 112' on the most loaded side of slot 13 comprises a check valve, while the restriction 25, 25' on the least loaded side of slot 13 comprises no check valve.

It has been found, that to ensure a favourable transfer of forces through the plunger 29 and the slide bearing pad 27, preferably the area of the plunger bottom 31 should be smaller than an effective area of the slide bearing pad 27. It has further been found, that to ensure a favourable transfer of forces through the plunger 29 and the pivot bearing pad 106, preferably the difference between the area of the plunger bottom 31 and the area defined by the pivot bearing seal 110 should be maximum 25%.

Typically, the rotational speed is 500-3600 rpm. The process fluid pressure is typically 1-16 bar. The bearing fluid supply pressure must be higher than the process fluid pressure, and is typically 10-40 bar.

Figure 6:
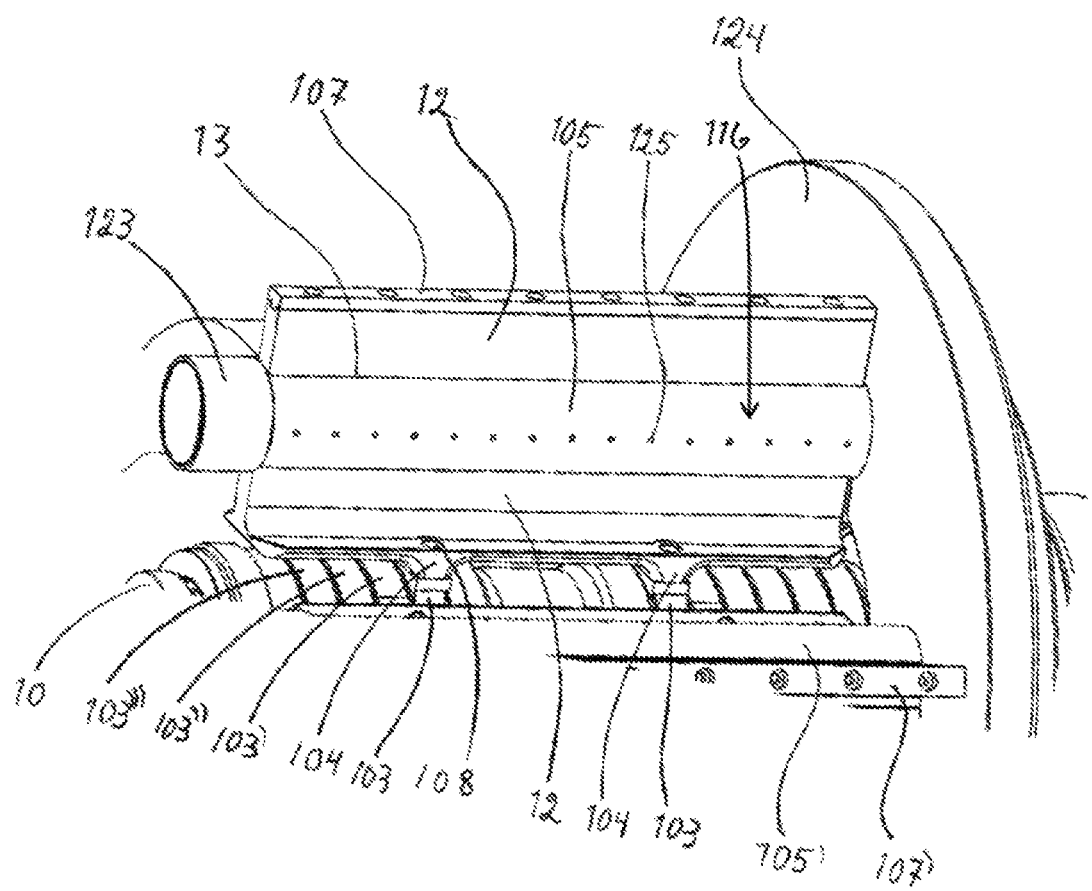
FIG. 6 is a perspective cutaway view of a vane bearing apparatus of a rotary sliding vane machine according to the invention.

FIG. 6 is a perspective cutaway view of an embodiment of a vane bearing apparatus of a rotary sliding vane machine according to the invention. The housing and most of the rotor body has been removed. A vane 12 is arranged in slot 13 of a slide bearing body 105 with a convex face 116. Ends if the slide bearing body 105 extend beyond slot 13 and vane 12, and are supported by end pivot bearings 123. End pivot bearings 123 are supported by cavity end caps 124, which are part of the rotor body. Left end cap is removed, and left end pivot bearing 123 is therefore visible in FIG. 6. Right end cap 124 is in place, and hides right end pivot bearing.

The pivot bearing pads have been removed. A row of inlets 125 to the second bearing fluid supply lines are arranged in slide bearing convex face 116.

It has been found, that at least 80% of the load from vanes 12 on the rotor body 101 may be transferred through the vane bearing apparatuses 102, the rest is transferred through the end pivot bearings 123. This large portion of the load transferred through the vane bearing apparatuses is very advantageous, since it reduces the required size of the end pivot bearings 123. Further, the support of slide bearing body 105 along its length, reduces its deflection.

FIG. 6 further illustrates a vane seal 107, spindle 10, vane flanges 104 and their connection to spindle ring 103 by means of bolts 108. Adjacent spindle rings 103', 103", 103''' are for not illustrated vanes. 105' designates the slide bearing body of an adjacent vane bearing apparatus, while 107' designates the vane seal for its vane.

The invention claimed is:

1. A rotary sliding vane machine for fluid processing, comprising:
 a housing with a cylindrical internal wall forming a cavity with an inlet and outlet for process fluid;
 a rotor rotatable in a rotational direction about an eccentric rotor axis of the cavity, a distance between an outer face of the rotor and the internal wall of the housing varies in the rotational direction;
 vanes rotatable about a center axis of the cavity, the vanes extend through outwardly directed slots in the rotor to the internal wall of the housing, there is relative movement between the vanes and the rotor during rotation;
 the rotor comprises a rotor body and vane bearing apparatuses, each vane bearing apparatus comprises:
 a slide bearing body with a slot for the vane, on each side of the slot the slide bearing body has a flat face facing the slot, forming a slide bearing for the vane;
 on each side of the slot the slide bearing body further has a cylindrical convex face facing away from the slot, the cylindrical convex faces on opposite sides of the slot have a common axis parallel to the rotor axis;
 on each side of the slot, a pivot bearing pad attached to or integral with the rotor body, the pivot bearing pad has a cylindrical concave face facing the slide bearing convex face, forming a pivot bearing for the vane, with the axis of the slide bearing convex faces forming a pivot bearing axis;
 on each side of the slot, a first bearing fluid supply line between a first bearing fluid supply and the pivot bearing concave face; and
 on each side of the slot, a second bearing fluid supply line between a second bearing fluid supply and the slide bearing flat face, for supplying bearing fluid to a bearing fluid film between the slide bearing flat face and the vane, wherein a pivot bearing seal surrounds an end of the first bearing fluid supply line at the pivot bearing concave face, the pivot bearing seal, the pivot bearing concave face and the slide bearing convex face defines a pressure chamber for hydraulic force transfer between the pivot bearing concave face and the slide bearing convex face.

2. The rotary sliding vane machine of claim 1, wherein the second bearing fluid supply is a second bearing fluid feed line in the slide bearing body.

3. The rotary sliding vane machine of claim 1, wherein the first bearing fluid supply line supplies bearing fluid to a bearing fluid film between the pivot bearing concave face and the slide bearing convex face.

4. The rotary sliding vane machine of claim 1, wherein the second bearing fluid supply is the pressure chamber between the pivot bearing seal, the pivot bearing concave face and the slide bearing convex face.

5. The rotary sliding vane machine of claim 1, wherein the first bearing fluid supply line opens into a recess in the pivot bearing concave face, and the pivot bearing seal surrounds the recess.

6. The rotary sliding vane machine of claim 5, wherein the rotor body concave face and the pivot bearing concave face are contiguous.

7. The rotary sliding vane machine of claim 5, wherein, the rotor body concave face and the pivot bearing concave face are separated by a rotor body seal.

8. The rotary sliding vane machine of claim 1, wherein, on each side of the slot, the rotor body has a cylindrical rotor body concave face facing the slide bearing convex face.

9. The rotary sliding vane machine of claim 1, wherein the difference between an effective area of the slide bearing flat face and an area defined by the pivot bearing seal is maximum 25%.

10. A rotary sliding vane machine for fluid processing, comprising:
 a housing with a cylindrical internal wall forming a cavity with an inlet and outlet for process fluid;
 a rotor rotatable in a rotational direction about an eccentric rotor axis of the cavity, a distance between an outer face of the rotor and the internal wall of the housing varies in the rotational direction;
 vanes rotatable about a center axis of the cavity, the vanes extend through outwardly directed slots in the rotor to the internal wall of the housing, there is relative movement between the vanes and the rotor during rotation;
 the rotor comprises a rotor body and vane bearing apparatuses, each vane bearing apparatus comprises:
 a slide bearing body with a slot for the vane, on each side of the slot the slide bearing body has a flat face facing the slot, forming a slide bearing for the vane;
 on each side of the slot the slide bearing body further has a cylindrical convex face facing away from the slot, the cylindrical convex faces on opposite sides of the slot have a common axis parallel to the rotor axis;
 on each side of the slot, a pivot bearing pad attached to or integral with the rotor body, the pivot bearing pad has a cylindrical concave face facing the slide bearing convex face, forming a pivot bearing for the vane, with the axis of the slide bearing convex faces forming a pivot bearing axis;

on each side of the slot, a first bearing fluid supply line between a first bearing fluid supply and the pivot bearing concave face; and on each side of the slot, a second bearing fluid supply line between a second bearing fluid supply and the slide bearing flat face, for supplying bearing fluid to a bearing fluid film between the slide bearing flat face and the vane, wherein, on each side of the slot:

the slide bearing body has an indentation forming a cylinder, with a bottom and an opening towards the slot;

the second bearing fluid supply line extends between the slide bearing convex face and the cylinder;

a plunger with a bottom is received in the cylinder;

a slide bearing pad with a face forming the slide bearing flat face is connected to or integral with the plunger;

a bearing fluid channel extends between an opening in the plunger and the slide bearing flat face;

the first bearing fluid supply line has a flow restriction;

wherein, during rotation:

pressure changes of the process fluid cause varying tangential forces on the vane, which tilt the vane towards and away from the slide bearing pad;

when the vane is tilted towards the slide bearing pad, the vane forces the slide bearing pad and the plunger towards the cylinder bottom, which increases the bearing fluid pressure in the cylinder, the flow restriction of the first bearing fluid supply line restricts return of bearing fluid to the supply, which maintains the bearing fluid pressure in the cylinder, and bearing fluid flows from the cylinder, through the bearing fluid channel to the slide bearing pad face, and to the slide bearing fluid film; and when the vane is tilted away from the slide bearing pad, bearing fluid at supply pressure flows from the first bearing fluid supply line to the pivot bearing concave face, and further through the second bearing fluid supply line to the cylinder, which forces the plunger and the bearing pad towards the vane, at the same time bearing fluid flows from the cylinder, through the bearing fluid channel to the slide bearing pad face, and to the slide bearing fluid film.

11. The rotary sliding vane machine of claim 10, wherein the area of the plunger bottom is smaller than an effective area of the slide bearing pad.

12. The rotary sliding vane machine of claim 10, wherein the difference between the area of the plunger bottom and the area defined by the pivot bearing seal is maximum 25%.

13. The rotary sliding vane machine of claim 10, wherein the slide bearing pads on opposite sides of the slot are unevenly loaded by the vane, the restriction of the first bearing fluid supply line on the most loaded side of the slot comprises a check valve, while the restriction of the first bearing fluid supply line on the least loaded side of the slot comprises no check valve.

\* \* \* \* \*